United States Patent [19]
Adamczyk et al.

[11] Patent Number: 5,979,159
[45] Date of Patent: Nov. 9, 1999

[54] EXHAUST AFTER-TREATMENT SYSTEM FOR AUTOMOTIVE VEHICLE

[75] Inventors: Andrew Anthony Adamczyk; Jeffrey Scott Hepburn, both of Dearborn, Mich.

[73] Assignee: Ford Global Technologies, Inc., Dearborn, Mich.

[21] Appl. No.: 09/039,525

[22] Filed: Mar. 16, 1998

[51] Int. Cl.[6] ........................ F01N 3/00
[52] U.S. Cl. ............ 60/274; 60/323; 60/324; 60/272
[58] Field of Search .............. 60/323, 287, 284, 60/288, 301, 324, 274, 272

[56] References Cited

U.S. PATENT DOCUMENTS

| | | | |
|---|---|---|---|
| 3,470,690 | 10/1969 | Thompson | 60/323 |
| 4,031,700 | 6/1977 | Yamazaki et al. | 60/322 |
| 4,662,173 | 5/1987 | Wilkinson | 60/313 |
| 5,072,583 | 12/1991 | Urushihara et al. | 60/313 |
| 5,248,859 | 9/1993 | Borla | 181/238 |
| 5,365,735 | 11/1994 | Weber et al. | 60/323 |
| 5,396,764 | 3/1995 | Rao et al. | 60/297 |
| 5,406,790 | 4/1995 | Hirota et al. | |

FOREIGN PATENT DOCUMENTS

| | | | |
|---|---|---|---|
| 4-258308 | 9/1992 | Japan . | |
| 5-216603 | 8/1993 | Japan . | |
| 2238004 | 5/1991 | United Kingdom | 60/302 |

*Primary Examiner*—Thomas E. Denion
*Assistant Examiner*—Binh Tran
*Attorney, Agent, or Firm*—Jerome R. Drouillard

[57] ABSTRACT

An exhaust after-treatment system for treating an exhaust stream from an internal combustion engine of an automotive vehicle includes first and second exhaust treatment devices in a parallel path, continuous flow, flow rate sensitive exhaust temperature modification circuit for conducting exhaust gases from the first treatment device to the second exhaust treatment device.

12 Claims, 2 Drawing Sheets

EXHAUST AFTER-TREATMENT SYSTEM FOR AUTOMOTIVE VEHICLE

FIELD OF THE INVENTION

The present invention relates to a system for treating the exhaust stream of an internal combustion engine so as to control the temperature of the exhaust stream, thereby enabling, for example, the use of an oxides of nitrogen ($NO_x$) trap.

BACKGROUND OF THE INVENTION

Automotive designers are directing considerable effort toward the development of $NO_x$ trap technology for lean burn automotive engines. A major engineering obstacle associated with the application of a $NO_x$ trap resides in the trap's rather limited temperature operating window. High $NO_x$ absorption efficiencies are achieved (greater than 80%) only when operation occurs within a very narrow temperature range, between 250–450° C. As a result, if an $NO_x$ trap is positioned so as to provide good $NO_x$ absorption efficiency during periods of light engine speed/load conditions, the $NO_x$ trap temperature during heavier engine speeds and loads will be too high (i.e., greater than 450° C.) for good $NO_x$ trap performance. If, on the other hand, the $NO_x$ trap is positioned farther away from the engine's exhaust manifold in order to provide for $NO_x$ trap operation within the desired range of 250–450° C. during high speed/load conditions, the $NO_x$ trap temperature could be considerably less than 250° C. during lighter engine speeds and loads.

The present invention provides a solution to the problem of $NO_x$ trap temperature control. Although it is known in the art to provide multiple flow passes for the exhaust gas so as to control the temperature of gases reaching an $NO_x$ trap, such systems, such as that disclosed in Japanese patent application 05-216603, utilize multiple valves to control the flow through the system. This is undesirable because cost and complexity are increased, while reliability is decreased. The present system permits governing of the temperature of exhaust flow reaching an $NO_x$ trap with a passive flow network, and without the need for externally controlled valves or other devices.

SUMMARY OF THE INVENTION

An exhaust after-treatment system for treating the exhaust stream from an internal combustion engine of an automotive vehicle includes a first exhaust treatment device, second exhaust treatment device, and a parallel path, continuous flow, flow rate sensitive exhaust temperature modification circuit for conducting exhaust gases from the first exhaust treatment device to the second exhaust treatment device. The temperature modification circuit preferably comprises a plurality of parallel flow paths with at least one thermally insulated exhaust conduit having a relatively lower restriction to flow at lower mass flow rates and a relatively greater restriction to flow at higher mass flow rates, and at least one exhaust conduit without thermal insulation and having a relatively greater restriction to flow at lower mass flow rates and a relatively lower restriction to flow at higher mass flow rates. The exhaust temperature modification circuit conserves a relatively higher percentage of heat within the exhaust stream at lower mass flow rates, while rejecting a relatively higher percentage of heat within the exhaust stream at higher mass flow rates. In order to promote the transfer of heat at higher mass flow rates, at least one conduit may be equipped with a flow restrictor such as a laminar flow element (e.g., a monolithic exhaust treatment catalyst substrate) with or without an active washcoat.

According to another aspect of the present invention, a first exhaust treatment device preferably comprises a three-way catalyst, with a second exhaust treatment device preferably comprising an $NO_x$ trap.

According to another aspect of the present invention, a method of operating an exhaust after-treatment system in an automotive vehicle having a three-way catalyst, an $NO_x$ trap mounted downstream from the three-way catalyst, and a parallel path, continuous flow, flow rate sensitive exhaust temperature modification circuit for conducting exhaust gases from the three-way catalyst to the $NO_x$ trap during normal operation, comprises the steps of providing the three-way catalyst with an exhaust stream having a fuel-lean air/fuel ratio, cooling the exhaust stream leaving the three-way catalyst with the exhaust temperature modification circuit such that the temperature of exhaust entering the $NO_x$ trap does not exceed a first threshold value, and removing $NO_x$ from the exhaust stream with the $NO_x$ trap, while also accumulating unwanted $SO_x$ within the $NO_x$ trap. Further steps according to the present method involve operating the exhaust after-treatment system to purge the trap of $SO_x$ by providing the three-way catalyst with an exhaust stream having a stoichiometric air/fuel ratio, by cooling the exhaust stream leaving the three-way catalyst with an exhaust temperature modification circuit such that the temperature of exhaust entering the $NO_x$ trap exceeds the first threshold value but does not exceed a second threshold value, while removing accumulated $SO_x$ from the $NO_x$ trap by operating the trap at an elevated temperature produced in the exhaust gas heated by an exothermic reaction in the three-way catalyst.

It is an advantage of the present invention that an exhaust after-treatment system according to the invention will control the temperature of the exhaust stream flowing from a three-way catalyst into an $NO_x$ trap so as to allow maximum trapping efficiency without impairing the durability of the three-way catalyst.

It is another advantage of the present invention that the present exhaust after-treatment system does not rely on the use of valving to control the exhaust flow, but is passive and utilizes fluidic principles for controlling the exhaust flow through the network.

Other advantages as well as objects and features of the present invention will become apparent to the reader of this specification.

DETAILED DESCRIPTION OF PREFERRED EMBODIMENTS

Figure 1:
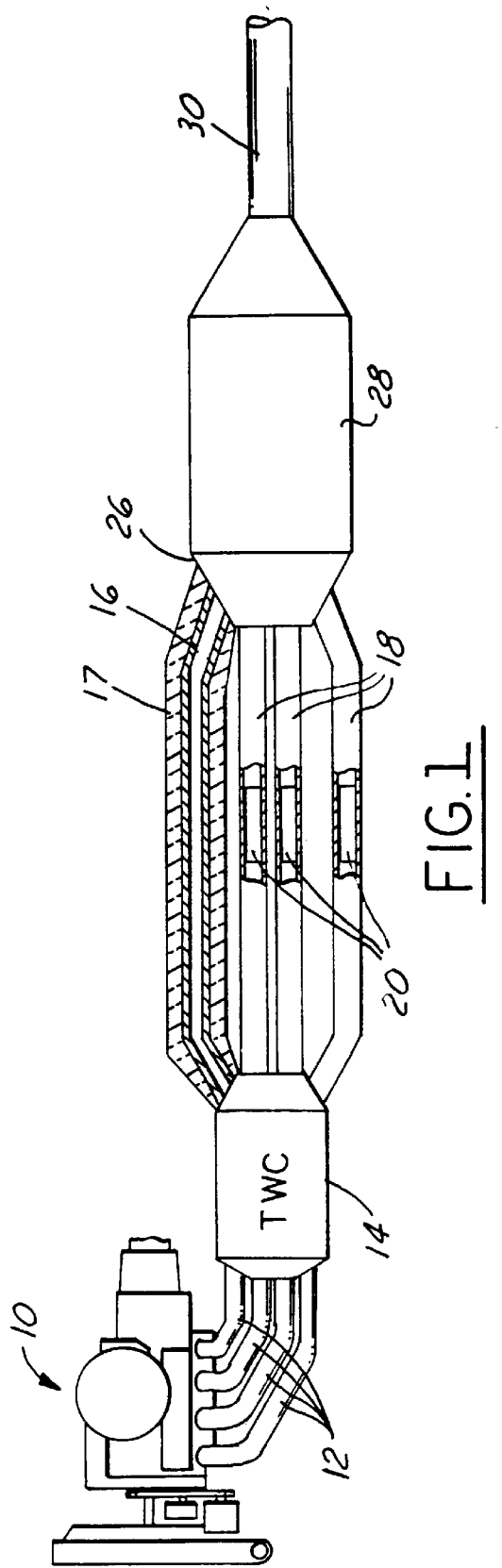
FIG. 1 illustrates an exhaust after-treatment system according to the present invention.

As shown in FIG. 1, an exhaust after-treatment system receives gas from engine 10 via exhaust manifold 12, which has multiple branches. A first exhaust treatment device is illustrated as comprising a three-way catalyst (TWC), but could comprise other types of exhaust treatment devices known to those skilled in the art and suggested by this disclosure. Exhaust gases treated by TWC 14 pass through a parallel path, continuous flow, flow rate sensitive exhaust temperature modification circuit which extends between the TWC 14 and second exhaust treatment device 26, which has an active section 28 incorporated therein. Although exhaust treatment device 26 is preferably an $NO_x$ trap, this device, too, could comprise other types of exhaust treatment devices known to those skilled in the art and suggested by this disclosure. Gases leaving exhaust treatment device 26 enter tailpipe 30 for further disposition.

Figure 3:
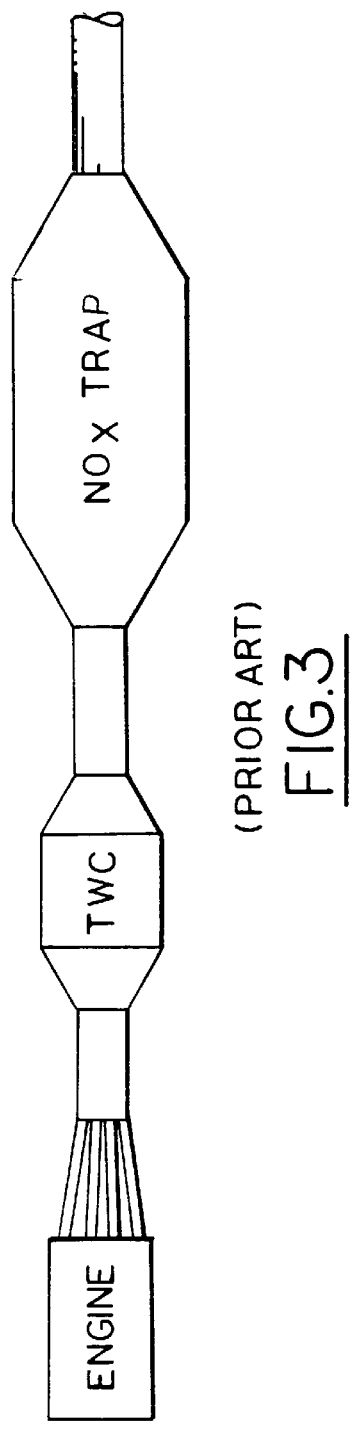
FIG. 3 illustrates a conventional lean-burn exhaust system.

An exhaust temperature modification circuit according to the present invention includes at least one thermally insulated exhaust conduit 16 having thermal insulation 17 imposed thereabout. Exhaust gases flowing through conduit 16 will maintain their temperature because heat rejection to the ambient will be minimized because of the thermal insulation 17. The plurality of exhaust conduits 18, which do not have thermal insulation, are equipped with laminar flow elements 20 which serve to restrict flow, thereby causing the flow through conduits 16 and 18 to be flow rate sensitive. In essence, conduits 18 form a heat exchanger for transferring heat from the exhaust stream to the ambient. The pressure drop through conduit 16 increases in a manner which is proportional to the square of the volumetric flow rate, whereas the pressure drop for flow through conduits 18 increases linearly with volumetric flow rate. As a result, at lower speeds and loads, most of the exhaust gas in a sample exhaust after-treatment system with inside diameters of each of conduit 16 and conduits 18 being approximately 2.5 cm, and with the length of the conduits 16 and 18 being about one meter each, will pass through insulated conduit 16. It is estimated that with a vehicle having a 2.0 L displacement four-cylinder engine and traveling at 40 kilometers per hour, approximately 60% of the exhaust flow will travel through conduit 16, with the resulting inlet temperature at second exhaust treatment device 26 increasing from 250° C. to approximately 300° C. The baseline of 250° C. is achieved with the prior art system shown in FIG. 3.

At 120 kilometers per hour with the vehicle described above, less than 40% of the total exhaust flow passes through conduit 16; the remaining amount, which is therefore in excess of 60%, passes through conduits 18. As a result, the inlet temperature at treatment device 26 is reduced from 525° C. with the system shown in FIG. 3 to 430° C.

It is generally desirable to maintain $NO_x$ trap inlet temperature within a window of about 250–450° C. over the entire lean-burn operating range, i.e., 40–120 kilometers per hour. The present invention also provides for a substantial reduction in the maximum $NO_x$ trap operating temperature and should result in an improved $NO_x$ trap thermal durability. In an operating condition of 200 kilometers per hour, FIG. 2 illustrates that the $NO_x$ trap inlet temperature is reduced from more than 770° C. to 680° C. with the present invention as compared with the system of FIG. 3.

The laminar flow elements 20 contained within conduits 18 may be about 6.25 cm in length in this example and comprise 400 cells per inch ceramic monolithic substrate stock.

Figure 2:
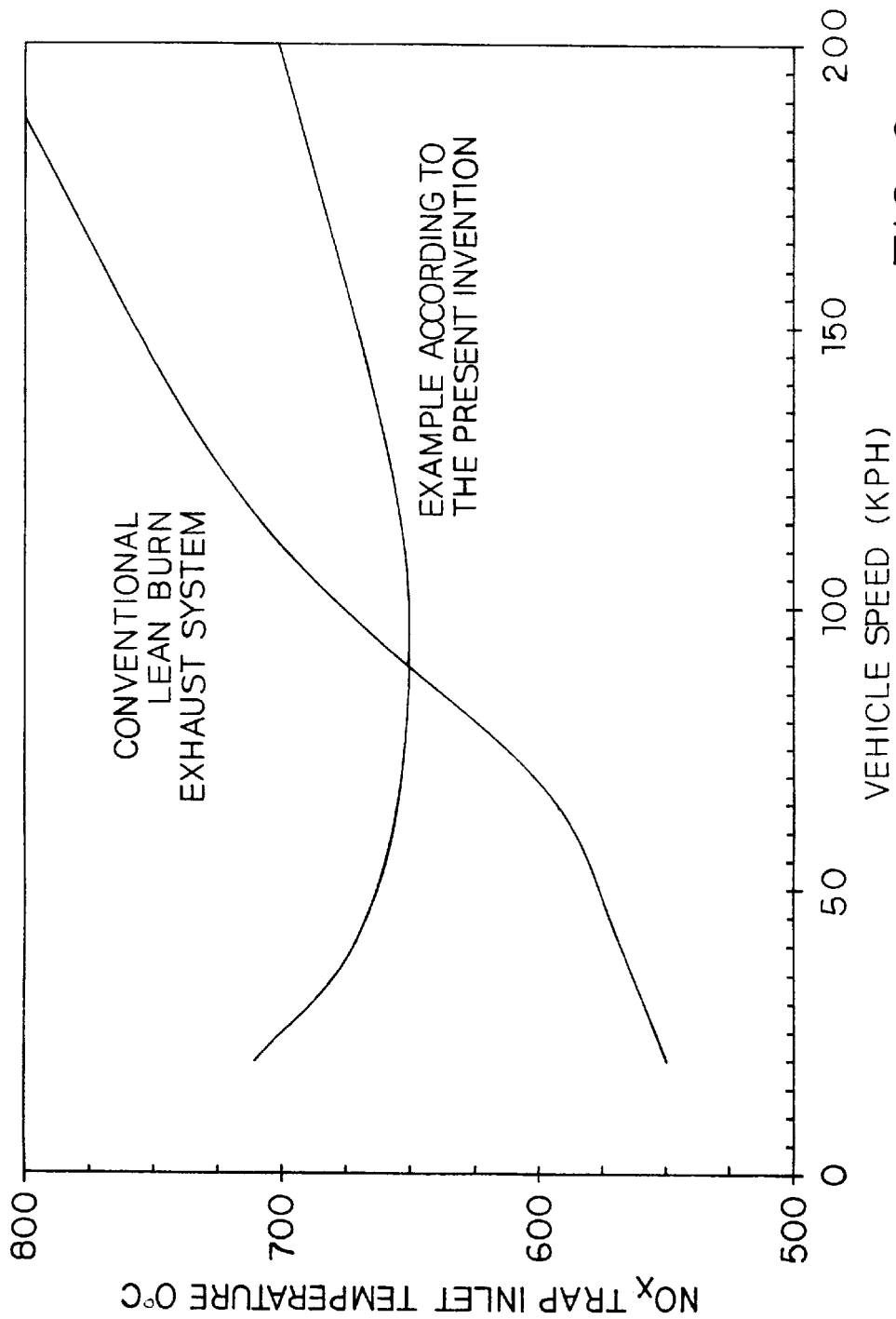
FIG. 2 illustrates a plot of exhaust system temperatures produced with a conventional lean-burn exhaust system and with the present inventive system.

FIG. 2 illustrates a temperature plot showing the manner in which a system according to the present invention may be used to provide purging of $SO_x$ from an $NO_x$ trap. (FIG. 2 assumes 950° C. exhaust gas temperature at the outlet of the TWC.) $NO_x$ trap desulfation requires a minimum temperature of 650° C. Substantial exotherms in the close-coupled TWC can be produced through the introduction of cylinder air/fuel ratio maldistribution within the engine. The exothermic energy generated within the TWC is carried downstream and raises the temperature of the $NO_x$ trap. Currently, the utility of this approach for $NO_x$ trap purging of $SO_x$ is limited by the thermal durability of the available TWC devices. In general, present TWCs cannot be subjected to temperatures in excess of 950° C. without causing irreparable thermal damage to the washcoat. With this limitation, desulfation of the $NO_x$ trap cannot be achieved with the conventional hardware shown in FIG. 3 when the vehicle speed is less than 90 kilometers per hour. However, with the present exhaust temperature modification circuit, the operating temperature of the TWC does not need to exceed 950° C. in order to obtain desulfation of the $NO_x$ trap at lower vehicle speeds because $NO_x$ trap temperatures greater than 650° C. can be achieved over a broad range of vehicle speeds as shown in FIG. 2.

Laminar flow elements 20 provide increased heat transfer because of the increased flow of gases to uninsulated conduits 18. The present system is said to be continuous flow because no valves or other types of flow gates are included in the system, e.g., gases flow through each of the conduits whenever the engine is being operated. For this reason, the present system may also be termed to be "passive". The present system is said to be flow rate sensitive because the relative proportion of gases flowing through thermally insulated exhaust conduit with respect to the conduit without thermal insulation changes with the mass flow rate. In other words, at lower mass flow rates, a greater proportion of gases pass through insulated conduit 16, whereas at higher mass flow rates a greater proportion of the gases passes through uninsulated conduit 18.

While the invention has been shown and described in its preferred embodiments, it will be clear to those skilled in the arts to which it pertains that many changes and modifications may be made thereto without departing from the scope of the invention.

We claim:

1. An exhaust after-treatment system for treating the exhaust stream from an internal combustion engine of an automotive vehicle, comprising:
   a first exhaust treatment device;
   a second exhaust treatment device; and
   a parallel path, continuous flow, flow rate sensitive exhaust temperature modification circuit for conducting exhaust gases from the first exhaust treatment device to the second exhaust treatment device; and
   wherein said exhaust temperature modification circuit conserves a relatively higher percentage of heat within the exhaust stream at lower mass flow rates, while rejecting a relatively higher percentage of heat within the exhaust stream at higher mass flow rates.

2. An exhaust after-treatment system according to claim 1, wherein said temperature modification circuit comprises a plurality of parallel flow paths, with at least one thermally insulated exhaust conduit having a relatively lower restriction to flow at lower mass flow rates and a relatively greater restriction to flow at higher mass flow rates, and at least one exhaust conduit without thermal insulation and having a relatively greater restriction to flow at lower mass flow rates and a relatively lower restriction to flow at higher mass flow rates.

3. An exhaust after-treatment system according to claim 1, wherein said temperature modification circuit comprises plurality of parallel flow paths with passive flow control, with at least one thermally insulated exhaust conduit having a relatively lower restriction to flow at lower mass flow rates and a relatively greater restriction to flow at higher mass flow rates, and at least one exhaust conduit having a laminar flow element providing a relatively greater restriction to flow and little heat rejection at lower mass flow rates and a relatively lower restriction to flow and greater heat rejection at higher mass flow rates.

4. An exhaust after-treatment system for treating the exhaust stream from an internal combustion engine of an automotive vehicle, comprising:

a first exhaust treatment device;

a second exhaust treatment device; and a multipass, flow rate sensitive exhaust temperature modification circuit for conducting exhaust gases from the first exhaust treatment device to the second exhaust treatment device, with said exhaust temperature modification circuit comprising a plurality of parallel flow paths which are all continuously open, which passively control of the flow division between the various paths, and which comprise at least one thermally insulated exhaust conduit which passes a relatively greater proportion of the exhaust flow at lower total mass flow rates and a relatively lesser proportion of the exhaust flow at higher total mass flow rates, and at least one exhaust conduit without thermal insulation which passes a relatively lesser proportion of total exhaust flow at lower mass flow rates and a relatively greater proportion of total flow at higher mass flow rates such that transfer of heat from the exhaust gases to the ambient will be minimized at low mass flow rates and maximized at high flow rates.

5. An exhaust after-treatment system according to claim 4, wherein said exhaust conduit without thermal insulation conducts the exhaust gas through a heat exchanger so as to increase heat transfer from the exhaust gas to the ambient.

6. An exhaust after-treatment system according to claim 4, wherein said heat exchanger comprises a laminar flow element.

7. An exhaust after-treatment system according to claim 6, wherein said laminar flow element comprises a monolithic exhaust treatment catalyst substrate.

8. An exhaust after-treatment system according to claim 6, wherein said laminar flow element comprises a monolithic exhaust treatment substrate which does not have an active washcoat.

9. An exhaust after-treatment system according to claim 4, wherein said first exhaust treatment device comprises a three-way catalyst and said second exhaust treatment device comprises a $NO_x$ trap.

10. An exhaust treatment system for an automotive vehicle, comprising:

a plurality of continuously open, parallel flow conduits, with at least one conduit being thermally insulated so as to conserve heat within the exhaust stream, and with at least one conduit having a heat exchanger so as to maximize the transfer of heat from the exhaust stream to the ambient, with said conduits having passive flow division control by means of relative flow resistances such that at lower mass flow rates a majority of the flow will pass through the thermally insulated conduit, with a majority of the flow passing through the conduit having the heat exchanger at higher mass flow rates.

11. An exhaust treatment system according to claim 10, further comprising a three-way catalyst located upstream from said conduits and a $NO_x$ trap located downstream from said conduits.

12. A method of operating an exhaust after-treatment system of an automotive vehicle having a three-way catalyst, a $NO_x$ trap mounted downstream from the three-way catalyst, and a parallel path, continuous flow, flow rate sensitive exhaust temperature modification circuit for conducting exhaust gases from the three-way catalyst to the $NO_x$ trap during normal operation, comprising the steps of:

providing the three-way catalyst with an exhaust stream having a fuel-lean air/fuel ratio;

cooling the exhaust stream leaving the three-way catalyst with the exhaust temperature modification circuit such that the temperature of exhaust entering the $NO_x$ trap does not exceed a first threshold value; and removing $NO_x$ from the exhaust stream with the $NO_x$ trap, while also accumulating unwanted $SO_x$ within the $NO_x$ trap;

and during operation to purge the trap of $SO_x$;

providing the three-way catalyst with an exhaust stream having a stoichiometric air/fuel ratio so as to provide significant exothermicity within the three-way catalyst;

cooling the exhaust stream leaving the three-way catalyst with the exhaust temperature modification circuit such that the temperature of exhaust entering the $NO_x$ trap exceeds the first threshold value, but does not exceed a second threshold; and removing accumulated $SO_x$ from the $NO_x$ trap by operating the trap at an elevated temperature caused by the exothermic reaction within the three-way catalyst.

* * * * *